(12) United States Patent
Harada et al.

(10) Patent No.: US 6,284,209 B1
(45) Date of Patent: Sep. 4, 2001

(54) AGENT FOR AND PROCESS OF TREATING EXHAUST GAS

(75) Inventors: Isao Harada; Sadaichi Komohara, both of Yamaguchi (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/488,706

(22) Filed: Jan. 21, 2000

(30) Foreign Application Priority Data

Jan. 21, 1999 (JP) .................................................. 11-012926

(51) Int. Cl.[7] ................................ B01J 8/00; B01J 23/34; B01J 23/40; B01J 23/72
(52) U.S. Cl. ........................ 423/210; 423/245.1; 423/248; 502/324; 502/326; 502/343; 502/345
(58) Field of Search ................................ 423/210, 245.1, 423/248; 502/324, 326, 343, 345

(56) References Cited

U.S. PATENT DOCUMENTS 4,996,030 * 2/1991 Kitahara .................................. 423/210

FOREIGN PATENT DOCUMENTS

| 0194366 A | 9/1986 | (EP) . |
| 0294142 A | 12/1988 | (EP) . |
| 0335792 A | 10/1989 | (EP) . |
| 53-028592 | 3/1978 | (JP) . |
| 8-192024 A | 7/1996 | (JP) . |
| 8-206444 A | 8/1996 | (JP) . |

* cited by examiner

*Primary Examiner*—Steven P. Griffin
*Assistant Examiner*—Maribel Medina
(74) *Attorney, Agent, or Firm*—Burns, Doane, Swecker, & Mathis, L.L.P.

(57) ABSTRACT

An agent for treating an exhaust gas, which is a mixture of a solid metal oxide and a solid metal carbonate as a main component, the metal being selected from the group of metal elements consisting of Mn, Fe, Ni, Cu and Zn. The agent is made of a molded article obtained by granulation, pelletization or extrusion of the mixture, and can be used in a process of treating an exhaust gas, capable of reducing the concentration of the exhaust gas containing a low concentration of a metal hydride gas and/or an organometallic gas to at least 0.5 ppm or lower.

18 Claims, 2 Drawing Sheets

AGENT FOR AND PROCESS OF TREATING EXHAUST GAS

BACKGROUND OF THE INVENTION

1. Field of the Invention

The present invention relates to an agent for treating an exhaust gas containing a metal hydride gas and/or an organometallic gas, and a process of treating the exhaust gas using the agent. More particularly, the present invention relates to a dry gas treating agent, which is used to remove an exhaust gas containing a low concentration of a metal hydride gas and an organometallic gas by passing it through the treating agent containing a solid metal oxide and a solid metal carbonate as a main component, and a treating process thereof.

2. Description of the Related Art

Various gases has been used as a gas for production of a semiconductor and called as a metal hydride gas such as $SiH_4$, $Si_2H_6$, $GeH_4$, $PH_3$, and $AsH_3$, or an organosilane. Among them, the organosilane gas such as methylsilane, ethylsilane, and phenylsilane has attracted special interest recently because it exerts a specific performance adequate for a dry photoresist agent in the production of a semiconductor device, or a low-dielectric material for formation of a layer insulation film.

However, any of these gases is drastically dangerous because of high toxicity, reactivity and spontaneous ignition property. Since these gases have high toxicity, e.g. severe irritation to the respiratory organ upon respiration, we can foresee a harmful influence on the human body and natural environment if these gases are released out of the system in a high concentration. Therefore, it is a natural responsibility for persons in charge to reduce the concentration of the organosilane gas contained in the exhaust gas from its production process and after the use semiconductor industry in view of retention of good working atmosphere and prevention of destruction of the natural environment.

Accordingly, it is required to make the exhaust gas harmless, before released in an air, and a dry treating agent made of a solid metal oxide (Examined Patent Publication (KOKOKU) No. 4-19886) or a solid metal carbonate (Unexamined Patent Publication (KOKAI) Nos. 59-160535 and 8-192024) and a treating process using the same have hitherto been suggested.

In case where these components are contained in the exhaust gas in a high concentration, heat is generated by the reaction with the treating agent made of the solid metal oxide and a sufficient treatment can be conducted by the successive reaction. However, in case of the exhaust gas having a comparatively low concentration, a sufficient treatment cannot be conducted because of poor reactivity.

In case of the treating agent made of the solid metal carbonate, a sufficient reaction takes place even in case of the exhaust gas having a comparatively low concentration, but the amount of the exhaust gas to be treated per volume of this treating agent is poor. If this treating agent is brought into contact with air after passing the exhaust gas through it, high temperature heat is generated, resulting in poor handling.

In a conventional process, it was considered to be effective to supply the exhaust gas while heating a packed bed so as to enhance the capability of treating the exhaust gas. However, this heating process requires high energy cost and gives rise to generation of particles from a heat insulating material in the vicinity of a heater and, therefore, it was a problem in a semiconductor factory where particles should be avoided.

SUMMARY OF THE INVENTION

An object of the present invention is to provide a treating process which is capable of treating in an efficient and safe manner even in case of the exhaust gas having a low concentration as a subject to be treated, and which does not require heating and does not attend generation of particles, and a treating agent.

The present inventors have studied intensively to attain the above object. As a result, they have found that, by using a solid metal oxide in combination with a solid metal carbonate, not only drawbacks in case of using them alone are covered, but also a higher treating capability is exerted by a synergistic effect. Thus, the present invention has been completed.

That is, the present invention is directed to an agent for treating an exhaust gas, comprising a mixture of a solid metal oxide and a solid metal carbonate as a main component, said metal being selected from the group of metal elements consisting of Mn, Fe, Ni, Cu and Zn, said mixture having a peak intensity ratio A/B within a range from 0.2 to 8 with a proviso that a value of a maximum peak intensity at $2\theta$ within a range from 38.6 to 39.0 is A (cupric oxide) and a value of a maximum peak intensity at $2\theta$ within a range from 31.1 to 31.5° is B (basic copper carbonate) in XRD, said agent being made of a molded article obtained by granulation and/or pelletization and extrusion of the mixture.

The present invention is also directed to a process of treating an exhaust gas, which comprises packing a packing container with a treating agent comprising a mixture of a solid metal oxide and a solid metal carbonate as a main component, and passing the exhaust gas containing a metal hydride gas and/or an organometallic gas through a bed packed with the treating agent, thereby to treat the exhaust gas at room temperature.

The present inventors have found that, by mixing an agent for treating an exhaust gas containing a metal hydride gas and/or an organometallic gas with a solid metal oxide and a solid metal carbonate, which have conventionally been used, in a specific ratio, not only drawbacks in case of using them alone are covered, but also a higher treating capability is exerted by a synergistic effect. By using this treating agent, an increase in life of the treating agent and a reduction in size of the apparatus can be attained as compared with a conventional treating process. This fact exerts a relative effect in view of energy cost.

DETAILED DESCRIPTION OF THE PREFERRED EMBODIMENTS

The present invention will be described in more detail hereinafter. In the present invention, the gas concentration is represented by % by volume unless otherwise stated.

The "exhaust gas" used in the present invention refers to an exhaust gas containing the following metal halide gas and/or organometallic gas. The metal hydride gas and organometallic gas contained in the exhaust gas as subjects to be treated in the present invention are as follows. The metal hydride gas includes, for example, $SiH_4$, $Si_2H_6$, $GeH_4$, $PH_3$, and $AsH_3$, and the organometallic gas includes, for example, a compound represented by the chemical formula $R_x \cdot MH_y$ (wherein R represents an alkoxy group, an alkyl group, a vinyl group or a phenyl group; M represents Si or Al; when M is Si, x represents 1 to 4, y represents an integer of 0 to 3, and x+y=4; and when M is Al, x represents 1 to 3, y represents an integer of 0 to 2, and x+y=3).

The metal hydride gas and organometallic gas remaining in the process for production semiconductors are often self-burning, and therefore are transferred to the treating process after being diluted with a $N_2$ gas in the semiconductor factory at present. The concentration after the dilution varies depending on the semiconductor factory, but these gases are usually diluted so that the concentration becomes 5 % by volume or lower.

Although almost all of the solid metal oxide and solid metal carbonate can be used in the present invention, preferred are those which are safely handled and are cheap, the metal element of which is selected from the group consisting of Mn, Fe, Ni, Cu and Zn.

A basic solid metal carbonate is also included in the solid metal carbonate. The basic solid metal carbonate is a substance represented by the general formula $M_x(CO_3)_y(OH)_z$ wherein M represents a metal element.

The mixture of the solid metal oxide and solid metal carbonate may be a combination of those having the same kinds of metal elements, and a combination of those having different kinds of metal elements.

The present inventors have found that a remarkable effect can be exerted in the treatment of the exhaust gas by using the solid metal oxide and solid metal carbonate in combination as compared with the case of using them alone.

Another effect is as follows. That is, when using the solid metal carbonate alone, the calorific value is higher than that in case of using the solid metal oxide alone and the temperature of the surface on exposure to an air reaches about 2000° C. after passing the exhaust gas through.

To inhibit this heat generation, an inert component can be added as a diluting agent. In that case, the treating capability is also lowered as a matter of course. However, heat generation can be inhibited while inhibiting the treating capability from decreasing by mixing with the solid metal oxide.

In the treating process of the present invention, the packing container is packed with the treating agent. In this case, those made of metal such as iron and stainless steel may be usually used.

In a conventional treating process using the solid metal carbonate, severe heat generation occurs when an air is introduced during the treatment of the exhaust gas, which was dangerous. In the present invention, the temperature on heat generation caused by exposure to an air can be reduced to 800C or lower, which is lower than the heat-resistant temperature of the packing container, by using the mixture of the solid metal oxide and solid metal carbonate.

The mixture of the solid metal oxide and solid metal carbonate can be obtained by charging them in any ratio in a mixer and mixing. Alternatively, portion of the solid metal carbonate can be converted into the solid metal oxide by heating while controlling the temperature and time. Preferably, a mixing ratio of the solid metal oxide to the solid metal carbonate is within a range from 1:0.2 to 1:5.

The vapor-solid contact capability is improved by preparing the solid metal oxide and solid metal carbonate from powders having a specific surface area of 1 $m^2$/g or higher, which is preferred. However, when the packing container is packed with the mixture in the form of powders, pressure loss increases and there causes troubles such as occasional blocking at an outlet piping of the packing container. Accordingly, the mixture is preferably used after molding into a treating agent by granulation, pelletization and extrusion.

The shape and size of the treating agent thus molded are not specifically limited, and proper shape and size can be selected according to the shape of the container with which the treating agent is packed. In case where the molding density of the treating agent is too low, the strength of the molded article may be lowered and the molded article is powdered during the use. In case where a fixed container is packed with a treating agent having a low molding density, the weight is reduced and, therefore, the volume of treating the exhaust gas per one container is lowered sometimes. To the contrary, when the molding density is enhanced, the strength of the molded article increases and the fixed container can be packed with a large amount of the treating agent. However, the exhaust gas is not easily diffused into the molded article, resulting in lowering of the treating capability.

Accordingly, the molding density is preferably adjusted within a range from 1.5 to 3.0 g/cm$^3$.

In case of molding, a binder may be used. The kind of the binder is not specifically limited and there can be used organic binders such as methylcellulose, methylethylcellulose, and polyvinyl alcohol; and inorganic binders such as water-glass, and bentonite.

According to the present inventors' study, most preferred combination of the solid metal oxide and solid metal carbonate is a combination of a cupric oxide and a basic copper carbonate.

The basic copper carbonate is a substance represented by $Cu_2(CO_3)y(OH)_z$, and $Cu_2(CO_3)(OH)_2$ referred to as malachite is generally used.

As the basic copper carbonate used in the present invention, for example, those obtained by neutralizing copper sulfate or copper nitrate with an alkali carbonate are suitably used. In that case, fine particles are obtained by conducting the neutralization reaction in a short time. When using a basic copper carbonate of the fine particles, the metal hydride gas and/or organometallic gas contained in the exhaust gas can be treated more suitably.

The particles of the basic copper carbonate are preferably those wherein the diameter of the primary particle determined by SEM observation is 3 $\mu$m or lower and the specific surface area is 20 $m^2$/g or higher.

On the other hand, those obtained by oxidizing powders of the basic copper carbonate or copper hydroxide with heating to a temperature within a range from 230 to 400° C. can be used as the cupric oxide. The cupric oxide is preferably in the form of fine particles and those obtained by oxidizing the above-described basic copper carbonates are suitably used. There can also be preferably used those obtained by oxidizing portion of the basic copper carbonate to convert into the cupric oxide in the same manner as described above.

The particles of the cupric oxide are preferably those wherein the diameter of the primary particle determined by SEM observation is 3 $\mu$m or lower and the specific surface area is 20 $m^2$/g or higher, like the basic copper carbonate.

Accordingly, the mixture containing the cupric oxide and basic copper carbonate as the main component may be those wherein the diameter of the primary particle determined by SEM observation is 3 μm or lower and the specific surface area is 20 m²/g or higher. In the same manner as described above, the mixture is preferably used after molding into a molded article by granulation, pelletization and extrusion.

The mixing ratio of the cupric oxide to the basic copper carbonate will be described below.

The mixing ratio of the mixture of the cupric oxide and basic copper carbonate can be determined by XRD. In the present invention, a peak intensity ratio A/B was measured, with a proviso that a peak value A of the cupric oxide is a value of a maximum peak intensity at 2θ within a range from 38.6 to 39.0° and a peak value B of the basic copper carbonate is a value of a maximum peak intensity at 2θ within a range from 31.1 to 31.5°.

In the present invention, the mixture having this peak intensity ratio A/B within a range from 0.2 to 8, preferably from 0.3 to 3, and more preferably from 0.5 to 2 is preferred because the exhaust gas containing the metal hydride gas and/or organometallic gas can be effectively treated.

By adjusting the peak intensity ratio A/B within the above range, a sufficient capability can be exerted in the treatment of the low-concentration exhaust gas as compared with the case of using the cupric oxide and basic copper carbonate alone. Moreover, heat generation can be reduced on exposure to an air after passing the exhaust gas through.

When the peak intensity ratio exceeds 8, the synergistic effect becomes too low to treat the exhaust gas containing a low concentration of the metal hydride gas and/or organometallic gas and, therefore, the effect of the present invention cannot be exerted. On the other hand, when the peak intensity ratio A/B is lower than 0.2, the synergistic effect is also lowered and, moreover, a high temperature is quickly reached on exposure to an air after passing the exhaust gas through, which is not preferred.

The process of treating the exhaust gas using the treating agent of the present invention will be described below.

Like a conventional example, the process of supplying the exhaust gas while heating the packed bed so as to enhance the capability of treating the exhaust gas is also effective in the present invention, however, this heating process requires high energy cost and gives rise to generation of particles from an insulating material.

In the present invention, even in case of the exhaust gas containing a low concentration of the metal hydride gas and/or organometallic gas, a high effect can be obtained if the exhaust gas is passed through the packed bed at room temperature.

The "room temperature" used herein refers to the fact that heat is not applied forcibly from the outside, and is within a range from 0 to 40° C. in a usual state.

To carry out the treating process of the present invention, the packed bed may be a series of packed beds, but it is preferred that a plurality of packed beds are arranged in parallel and are used alternatively as a packed bed and a virgin bed in view of the operation such as displacement of the treating agent.

With respect to the exhaust gas to be released into an air after passing through the treating agent, the concentration of the metal hydride gas and organometallic gas is usually reduced to 0.5 ppm or lower at an outlet of the packing container.

In case where a gas at the outlet of the treating container is monitored at a permissible concentration (1 to 5 ppm) at which the metal hydride gas and organometallic gas in the exhaust gas may be released into an air and, as a result, the gas was detected, the used treating agent must be quickly replaced by a new treating agent.

The process of monitoring the outlet gas includes, for example, gas chromatograph, detecting tube, and gas detector, and any process can be used.

In the present invention, when the metal hydride gas or organometallic gas is detected at the concentration lower than the permissible concentration in the outlet gas, the metal hydride gas or organometallic gas in the exhaust gas is calculated in terms of 100% and a value obtained by dividing an integrated amount of the gases by a capacity of the bed packed with the treating agent is taken as a treating capability per volume. A value obtained by dividing by a weight of the treating agent is taken as a treating capability per weight.

The amount of the exhaust gas to be passed through the packed bed is represented by a space velocity (SV) value $[H^{-1}]$ as an index which shows a proportion of the amount of the exhaust gas passed through the packed bed for one hour based on the capacity of the bed packed with the treating agent.

The smaller this SV value, the higher the numerical value of the treating capability becomes. It is required to increase the size of the packing container for treating agent so as to reduce the SV value. In that case, the workability on carriage or displacement tends to become inferior.

To the contrary, when the SV value is increased, the treating agent tends to be leaked in a short time without treating the exhaust gas completely.

Therefore, when using the treating agent for the industrial purpose, it is desired to treat at the SV value within a range from 10 to 1000 $[H^{-1}]$, and preferably from 30 to 500 $[H^{-1}]$.

As described above, the mixture of the solid metal oxide and solid metal carbonate is capable of exerting a treating effect by reacting with the exhaust gas containing a low concentration of the metal hydride gas and/or organometallic gas in the packed bed or container, thereby to fix the metal component on the surface of the mixture of the solid metal oxide and solid metal carbonate.

The following Examples and Comparative Examples further illustrate the present invention in more detail.

EXAMPLE 1

1 Part of a cupric oxide having a specific surface area of 53 m²/g was mixed with 1 part of a basic copper carbonate having a specific surface area of 38 m²/g. Without mixing a binder, the mixture was pelletized into a cylindrical tablet having a size of 3 mmφ×3 mmH using a tablet machine to obtain a treating agent. The molding density was 2.2 g/cm³.

The specific surface area of the treating agent thus molded was 45 m²/g. A stainless steel column having an inner diameter of 16.5φ and a length of 200 mm was packed with 40 cc of this treating agent.

Then, a silane gas ($SiH_4$) as a subject gas to be treated was diluted with a helium gas to prepare 0.8% by volume of a silane-containing gas, which was passed through the column (SV value =100 $[H^{-1}]$) at room temperature at a flow rate of 67 cc/minute and the concentration of the silane gas was analyzed at an outlet of a packed bed. The analysis was conducted by using a gas chromatograph (GC-3000, manufactured by Hitachi Corp.) equipped with a photoionization detector (PID). A separation column is Porapak-P® and a detection limit of silane is 0.5 ppm.

The integrated amount of a pure silane gas penetrated when the packed bed outlet concentration exceeds 5 ppm was determined and the volume of the pure silane gas passed through one liter of the treating agent was taken as a treating capability (L/L). As is apparent from the results shown in Table 1, the treating agent showed a high treating capability.

After the silane gas was detected at the outlet, the column was purged with $N_2$ and this treating agent was taken out on a stainless steel pallet. On heat generation, the temperature of the surface was measured by using an infrared radiation thermometer (1R-AHOT, IR-AH1S, manufactured by CHINO Co.). The maximum temperature at this time is shown in Table 1.

EXAMPLES 2 and 3

The same manner as in Example 1 was repeated, except that the cupric oxide and basic copper carbonate were mixed in a mixing ratio shown in Table 1. The results are shown in Table 1.

EXAMPLES 4 to 9

The same manner as in Example 1 was repeated, except that the solid metal oxide and solid metal carbonate were mixed in a mixing ratio shown in Table 1 in place of the mixture of the cupric oxide and basic copper carbonate. The results are shown in Table 1.

EXAMPLES 10 to 12

The same manner as in Example 1 was repeated, except that the degree of dilution of the subject gas to be treated with the helium gas was changed as shown in Table 1.

As is apparent from the results shown in Table 1, the treating agent exerted a high treating capability. Examples 13 to 18

The same manner as in Example 1 was repeated, except that the subject gas to be treated is composed of components shown in Table 2. As is apparent from the results shown in Table 2, the treating agent exerted a high treating capability.

EXAMPLE 19

1 Part of a cupric oxide having a specific surface area of 53 $m^2/g$ was mixed with 1 part of a basic copper carbonate having a specific surface area of 38 $m^2/g$. To the mixture, 0.3 part of water and 0.02 part of methylcellulose were added, followed by granulation to form particles in size of 3 to 5 mm$\phi$ and further drying at 100° C.

In the same manner as in Example 1, except that the treating agent thus granulated was used, the exhaust gas was treated.

As is apparent from the results shown in Table 2, the treating agent exerted a high treating capability.

EXAMPLES 20 to 26

The same cupric oxide and basic copper carbonate as those in Example 1 were mixed in an optionally changed ratio. To the mixture, 10% by weight of bentonite and 35% by weight of water were added. Then, the mixture was extruded by using a desk pelleter having an opening diameter of 2.5 mm$\phi$ and dried at 120° C. to obtain a treating agent. This treating agent was analyzed by XRD (manufactured by Rigaku Co.) and a peak intensity ratio A/B was measured, with a proviso that a peak value A of the cupric oxide is a value of a maximum peak intensity at $2\theta$ within a range from 38.6 to 39.0° and a peak value B of the basic copper carbonate is a value of a maximum peak intensity at $2\theta$ within a range from 31.1 to 31.5°. Each peak intensity ratio is shown in Table 3. The same manner as in Example 1 was repeated, except that a stainless steel column having an inner diameter of 16.5$\phi$ and a length of 200 mm was packed with 40 cc of this treating agent.

The results are shown in Table 3. As the treating capability, a treating capability value per volume (L/L) and a treating capability value per weight (L/kg) were shown. As shown in Table 3, any of the treating agents exerted a high treating capability.

Figure 1:
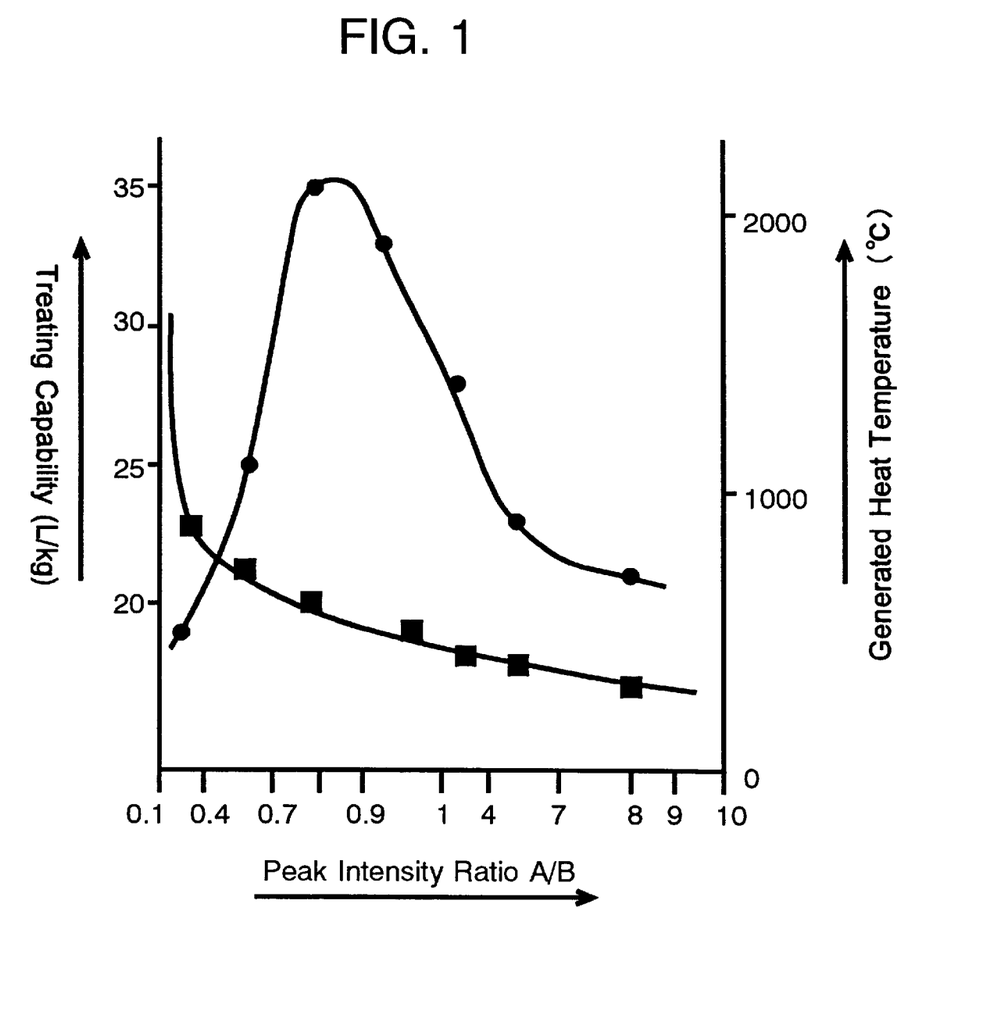
FIG. 1 is a graph showing a change in treating capability and a change in temperature on heat generation, depending on a peak intensity ratio A/B in XRD of a mixture of a cupric oxide and a basic copper carbonate.
Figure 2:
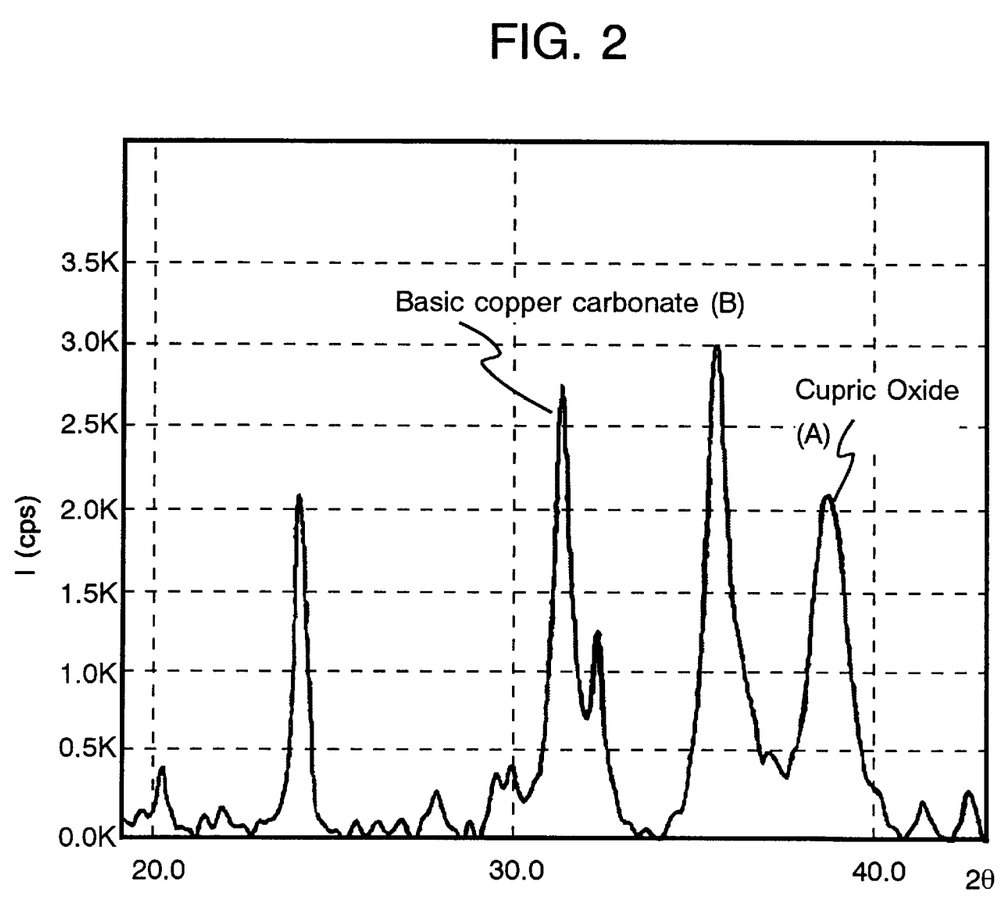
FIG. 2 is a XRD chart of a mixture of a cupric oxide and a basic copper carbonate in Example 22.

A relation between a peak intensity ratio and a treating capability value, and a peak intensity ratio and a temperature on heat generation caused by exposure to an air are shown in FIG. 1. A XRD chart of Example 22 is shown in FIG. 2.

COMPARATIVE EXAMPLE 1 and 2

The treating agent, which was obtained by extruding the basic copper carbonate alone (Comparative Example 1) or cupric oxide alone (Comparative Example 2) in the same manner as in Examples 20 to 26, was evaluated in the same manner, respectively. The results are shown in Table 3.

COMPARATIVE EXAMPLES 3 to 11

In the same manner as in Example 1, except that the treating agent was obtained from the solid metal oxide used in the respective Examples alone, the exhaust gas was treated. As is apparent from the results shown in Table 4, the treating agents are inferior in treating capability to the respective Examples.

COMPARATIVE EXAMPLES 12 to 17

In the same manner as in Example 1, except that the treating agent was obtained from the solid metal carbonate used in the respective Examples alone, the exhaust gas was treated. As is apparent from the results shown in Table 5, the treating agents are inferior in treating capability to the respective Examples. It was also observed that the surface of almost all of the treating agents became red hot on exposure to an air after the treatment.

TABLE 1

| Example | Main component Solid metal oxide A | Main component Solid metal carbonate B | Mixing ratio (% by weight) A/B | Molded article Specific surface area m²/g | Molded article Shape | Gas as subject to be treated Name of gas | Gas as subject to be treated Gas conc. (%) | Treating capability L/L | Temperature on heat generation °C. |
|---|---|---|---|---|---|---|---|---|---|
| 1 | CuO | Cu$_2$(OH)$_2$CO$_3$ | 1/1 | 47 | Tablet | Monosilane | 0.8 | 34 | 470 |
| 2 | CuO | Cu$_2$(OH)$_2$CO$_3$ | 1/0.3 | 47 | Tablet | Monosilane | 0.8 | 26 | 400 |
| 3 | CuO | Cu$_2$(OH)$_2$CO$_3$ | 1/2 | 47 | Tablet | Monosilane | 0.8 | 29 | 380 |
| 4 | Li$_2$O | ZnCO$_3$ | 1/1 | 24 | Tablet | Monosilane | 0.8 | 21 | 260 |
| 5 | NiO | NiCO$_3$ | 1/2 | 30 | Tablet | Monosilane | 0.8 | 18 | 300 |
| 6 | Fe$_2$O$_3$ | MnCO$_3$ | 1/1.5 | 85 | Tablet | Monosilane | 0.8 | 37 | 330 |
| 7 | MnO$_2$ | MnCO$_3$ | 1/0/5 | 100 | Tablet | Monosilane | 0.8 | 29 | 290 |
| 8 | MnO$_2$ | Cu$_2$(OH)$_2$CO$_3$ | 1/2 | 130 | Tablet | Monosilane | 0.8 | 28 | 250 |
| 9 | ZnO$_2$ | Ni$_2$(OH)$_2$CO$_3$ | 1/1 | 42 | Tablet | Monosilane | 0.8 | 23 | 200 |
| 10 | CuO | Cu$_2$(OH)$_2$CO$_3$ | 1/1 | 47 | Tablet | Monosilane | 0.3 | 30 | 390 |
| 11 | CuO | Cu$_2$(OH)$_2$CO$_3$ | 1/1 | 47 | Tablet | Monosilane | 0.1 | 26 | 350 |
| 12 | CuO | Cu$_2$(OH)$_2$CO$_3$ | 1/1 | 47 | Tablet | Monosilane | 4.8 | 27 | 360 |

TABLE 2

| Example | Main component Solid metal oxide A | Main component Solid metal carbonate B | Mixing ratio (% by weight) A/B | Molded article Specific surface area m²/g | Molded article Shape | Gas as subject to be treated Name of gas | Gas as subject to be treated Gas conc. (%) | Treating capability L/L | Temperature on heat generation °C. |
|---|---|---|---|---|---|---|---|---|---|
| 13 | CuO | Cu$_2$(OH)$_2$CO$_3$ | 1/1 | 47 | Tablet | Disilane | 0.8 | 17 | 280 |
| 14 | CuO | Cu$_2$(OH)$_2$CO$_3$ | 1/1 | 47 | Tablet | Arsine | 0.8 | 26 | 200 |
| 15 | CuO | Cu$_2$(OH)$_2$CO$_3$ | 1/1 | 47 | Tablet | Phosphine | 0.8 | 20 | 300 |
| 16 | CuO | Cu$_2$(OH)$_2$CO$_3$ | 1/1 | 47 | Tablet | Germane | 0.8 | 23 | 260 |
| 17 | CuO | Cu$_2$(OH)$_2$CO$_3$ | 1/1 | 47 | Tablet | Trimethoxy silane | 0.8 | 27 | 160 |
| 18 | CuO | Cu$_2$(OH)$_2$CO$_3$ | 1/1 | 47 | Tablet | Dimethyl aluminum hydride | 0.8 | 18 | 130 |
| 19 | CuO | Cu$_2$(OH)$_2$CO$_3$ | 1/1 | 47 | Granular | Monosilane | 0.8 | 36 | 360 |

TABLE 3

| Example and Comp. Example | Main component Solid metal oxide A | Main component Solid metal carbonate B | XRD Peak intensity ratio A/B | Molded article (extrusion) Specific surface area (m²/g) | Molded article (extrusion) Molding density (g/cm³) | Gas as subject to be treated Name of gas | Gas as subject to be treated Gas conc. (%) | Treating capability L/L | Treating capability L/kg | Temperature on heat generation °C. |
|---|---|---|---|---|---|---|---|---|---|---|
| Comp. Ex. 1 | — | Cu$_2$(OH)$_2$CO$_3$ | — | 38 | 2.0 | Monosilane | 0.8 | 19 | 16 | 1600 |
| Example 20 | CuO | Cu$_2$(OH)$_2$CO$_3$ | 0.21 | 39 | 2.1 | Monosilane | 0.8 | 23 | 19 | 795 |
| 21 | CuO | Cu$_2$(OH)$_2$CO$_3$ | 0.44 | 40 | 2.1 | Monosilane | 0.8 | 30 | 25 | 590 |
| 22 | CuO | Cu$_2$(OH)$_2$CO$_3$ | 0.78 | 43 | 2.1 | Monosilane | 0.8 | 42 | 35 | 500 |
| 23 | CuO | Cu$_2$(OH)$_2$CO$_3$ | 0.93 | 44 | 2.1 | Monosilane | 0.8 | 40 | 33 | 420 |
| 24 | CuO | Cu$_2$(OH)$_2$CO$_3$ | 2.45 | 45 | 2.1 | Monosilane | 0.8 | 32 | 27 | 370 |
| 25 | CuO | Cu$_2$(OH)$_2$CO$_3$ | 6.03 | 47 | 2.1 | Monosilane | 0.8 | 28 | 23 | 340 |
| 26 | CuO | Cu$_2$(OH)$_2$CO$_3$ | 7.89 | 49 | 2.1 | Monosilane | 0.8 | 25 | 21 | 300 |
| Comp. Ex. 2 | CuO | — | — | 50 | 2.2 | Monosilane | 0.8 | 23 | 19 | 260 |

TABLE 4

| Comp. Example | Main component | | Mixing ratio (% by weight) A/B | Molded article | | Gas as subject to be treated | | Treating capability L/L | Temperature on heat generation °C. |
|---|---|---|---|---|---|---|---|---|---|
| | Solid metal oxide A | Solid metal carbonate B | | Specific surface area m²/g | Shape | Name of gas | Gas conc. (%) | | |
| 3 | CuO | — | — | 53 | Tablet | Monosilane | 0.8 | 20 | 240 |
| 4 | CuO | — | — | 53 | Tablet | Monosilane | 0.3 | 11 | 180 |
| 5 | CuO | — | — | 53 | Tablet | Monosilane | 0.1 | 4 | 60 |
| 6 | Li₂O | — | — | 53 | Tablet | Monosilane | 0.8 | 3 | 40 |
| 7 | NiO | — | — | 53 | Tablet | Monosilane | 0.8 | 15 | 160 |
| 8 | Fe₂O₃ | — | — | 53 | Tablet | Monosilane | 0.8 | 14 | 180 |
| 9 | MnO₂ | — | — | 53 | Tablet | Monosilane | 0.8 | 18 | 150 |
| 10 | Al₂O₃ | — | — | 53 | Tablet | Monosilane | 0.8 | 2 | 40 |
| 11 | ZnO₂ | — | — | 53 | Tablet | Monosilane | 0.8 | 13 | 100 |

TABLE 5

| Comp. Example | Main component | | Mixing ratio (% by weight) A/B | Molded article | | Gas as subject to be treated | | Treating capability L/L | Temperature on heat generation °C. |
|---|---|---|---|---|---|---|---|---|---|
| | Solid metal oxide A | Solid metal carbonate B | | Specific surface area m²/g | Shape | Name of gas | Gas conc. (%) | | |
| 12 | — | Cu₂(OH)₂CO₃ | — | 38 | Tablet | Monosilane | 0.8 | 22 | 1700 |
| 13 | — | ZnCO₃ | — | 46 | Tablet | Monosilane | 0.8 | 16 | 600 |
| 14 | — | NiCO₃ | — | 28 | Tablet | Monosilane | 0.8 | 14 | 700 |
| 15 | — | MnCO₃ | — | 91 | Tablet | Monosilane | 0.8 | 17 | 1800 |
| 16 | — | CaCO₃ | — | 2 | Tablet | Monosilane | 0.8 | 0 | 20 |
| 17 | — | Ni₂(OH)₂CO₃ | — | 45 | Tablet | Monosilane | 0.8 | 15 | 1200 |

What is claimed is:

1. An agent for treating an exhaust gas, comprising a mixture of a solid metal oxide and a solid metal carbonate as a main component, the metal of the oxide being selected from the group of metal elements consisting of Cu, Li, Ni, Fe, Mn and Zn, and the metal of the carbonate being selected from the group of metal elements consisting of Mn, Ni, Cu and Zn, said agent being made of a molded article obtained by granulation, A pelletization or extrusion of the mixture wherein the molded article has a solid density within the range of 1.5 to 3.0 g/cm³.

2. The agent according to claim 1, wherein the temperature on heat generation caused on exposure of the agent to an air after passing the exhaust gas through the agent is 800° C. or lower in term of the surface temperature of the agent.

3. The agent according to claim 1, wherein a specific surface area of the solid metal oxide, the solid metal carbonate, and the mixture of the solid metal oxide and the solid metal carbonate is 1 m²/g or higher.

4. An agent for treating an exhaust gas, comprising a mixture of a cupric oxide and a basic copper carbonate as a main component, said mixture having a peak intensity ratio A/B within a range from 0.2 to 8 with a proviso that a value of a maximum peak intensity at 2θ within a range from 38.6 to 39.0° is A (cupric oxide) and a value of a maximum peak intensity at 2θ within a range from 31.1 to 31.5° is B (basic copper carbonate) in XRD, said agent being made of a molded article obtained by granulation, pelletization or extrusion of the mixture wherein the molded article has a solid density within the range of 1.5 to 3.0 g/cm³.

5. The agent according to claim 4, wherein the peak intensity ratio A/B is within a range from 0.3 to 3.

6. The agent according to claim 5, wherein the peak intensity ratio A/B is within a range from 0.5 to 2.

7. The agent according to claim 4, wherein a diameter of a primary particle of the mixture of the cupric oxide, the basic copper carbonate, and the mixture of the cupric oxide and the basic copper carbonate is 3 μm or lower.

8. The agent according to claim 4, wherein a specific surface area of the mixture of the cupric oxide, the basic copper carbonate, and the mixture of the cupric oxide and the basic copper carbonate is 20 m²/g or higher.

9. The agent according to claim 4, wherein a solid density of the molded article obtained by granulation, pelletization or extrusion is within a range from 1.5 to 3.0 g/cm³.

10. The agent according to claim 4, wherein a copper oxide obtained by oxidizing the basic copper carbonate or a copper hydroxide with heating is used as the cupric oxide.

11. The agent according to claim 4, wherein heat generation caused on exposure of the agent to an air after passing the exhaust gas through the agent is 800° C. or lower in term of the surface temperature of the agent.

12. A process of treating an exhaust gas, which comprises packing a packing container with a treating agent comprising a mixture of a solid metal oxide and a solid metal carbonate as a main component, and passing the exhaust gas containing a metal hydride gas and/or an organometallic gas through a bed packed with the treating agent, thereby to treat the exhaust gas at room temperature wherein the treating agent has a solid density within the range of 1.5 to 3.0 g/cm³.

13. The process according to claim 12, wherein the treating agent comprises a mixture of a solid metal oxide and a solid metal carbonate as a main component, the metal of the oxide being selected from the group of metal elements consisting of Cu, Li, Ni, Fe, Mn and Zn, and the metal of the carbonate being selected from the group of metal elements consisting of Mn, Ni, Cu and Zn, said treating agent being made of a molded article obtained by granulation, pelletization or extrusion of the mixture.

14. The process according to claim 12, wherein the treating agent comprises a mixture of a solid metal oxide and a solid metal carbonate as a main component, said mixture having a peak intensity ratio A/B within a range from 0.2 to 8 with a proviso that a value of a maximum peak intensity at 2θ within a range from 38.6 to 39.0° is A (cupric oxide) and a value of a maximum peak intensity at 2θ within a range from 3 1. 1 to 31. 5° is B (basic copper carbonate) in XRD, said agent being made of a molded article obtained by granulation, pelletization or extrusion of the mixture.

15. The process according to claim 12, wherein the component contained in the exhaust gas is a metal hydride gas selected from the group consisting of as $SiH_4$, $Si_2H_6$, $GeH_4$, $PH_3$, and $AsH_3$, and an organometallic gas represented by the chemical formula $R_x MH_y$ (wherein R represents an alkoxy group, an alkyl group, a vinyl group or a phenyl group; M represents Si or Al; x represents 1 to 4, y represents an integer of 0 to 3, and x+y=4 when M is Si; and x represents 1 to 3, y represents an integer of 0 to 2, and x+y=3 when M is Al).

16. The process according to claim 12, wherein a concentration of the metal hydride gas and/or organometallic gas contained in the exhaust gas is 5 % by volume or lower.

17. The process according to claim 12, where in a flow rate of the exhaust gas to be passed through the packed bed is within a range from 10 to 1000 at a value of $SV[H^{-1}]$.

18. The process according to claim 12, wherein the treating agent comprising the mixture of the solid metal oxide and the solid metal carbonate as the main component is capable of reducing the concentration of any silane exhaust gas to at least 0.5 ppm or lower.

* * * * *

UNITED STATES PATENT AND TRADEMARK OFFICE
CERTIFICATE OF CORRECTION

PATENT NO. : 6,284,209 B1
DATED : September 4, 2001
INVENTOR(S) : Isao Harada et al.

It is certified that error appears in the above-identified patent and that said Letters Patent is hereby corrected as shown below:

Column 11,
Line 45, before "pelletization" delete "A".

Column 14,
Line 10, change "where in" to -- wherein --.

Signed and Sealed this

Thirtieth Day of July, 2002

Attest:

Attesting Officer

JAMES E. ROGAN
Director of the United States Patent and Trademark Office